US012449079B2

(12) United States Patent
Wu

(10) Patent No.: US 12,449,079 B2
(45) Date of Patent: Oct. 21, 2025

(54) INFLATOR VALVE CONNECTOR

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 11 days.

(21) Appl. No.: 18/440,419

(22) Filed: Feb. 13, 2024

(65) Prior Publication Data
US 2024/0369167 A1 Nov. 7, 2024

(30) Foreign Application Priority Data

May 3, 2023 (TW) .................................. 112116485

(51) Int. Cl.
*F16L 37/44* (2006.01)
(52) U.S. Cl.
CPC .................................... *F16L 37/44* (2013.01)
(58) Field of Classification Search
CPC . F16L 37/44; F16L 29/00; F16L 29/04; Y10T 137/3584; Y10T 137/3724; F25B 45/00; B60C 29/06; B60C 29/062; B60C 29/064
See application file for complete search history.

(56) References Cited

U.S. PATENT DOCUMENTS

| | | | | |
|---|---|---|---|---|
| 4,890,642 A * | 1/1990 | Smazik | ................... | F16L 29/04 |
| | | | | 251/339 |
| 6,557,404 B2 * | 5/2003 | Ziarati | ................... | B60C 29/064 |
| | | | | 73/146 |
| 6,865,931 B1 * | 3/2005 | Ziarati | ................... | B60C 29/064 |
| | | | | 73/146.8 |
| 7,182,094 B2 * | 2/2007 | Wu | ................... | F16K 31/52433 |
| | | | | 251/237 |
| 2011/0108133 A1 * | 5/2011 | Huang | ................... | B60C 29/064 |
| | | | | 137/223 |
| 2013/0087228 A1 | 4/2013 | Wang | | |

FOREIGN PATENT DOCUMENTS

| CN | 210266042 U | 4/2020 |
|---|---|---|
| TW | 202146797 A | 12/2021 |

* cited by examiner

*Primary Examiner* — Hailey K. Do
(74) *Attorney, Agent, or Firm* — Muncy, Geissler, Olds & Lowe, P.C.

(57) ABSTRACT

An inflator valve connector includes a body, a connecting assembly, a pushing member, and a lever. The body has an air channel. The connecting assembly is rotatably connected to the body and configured to connect with an air valve. The pushing member is movably inserted through the body and the connecting assembly between a first position and a second position, and has a pushing end and a pushed end. The pushing member is provided with at least one air passage communicating with the air channel. The lever is selectively abutting against the pushed end in an unlock position and a lock position and is configured to actuate the pushing member to move relative to the body and the connecting assembly.

12 Claims, 8 Drawing Sheets

INFLATOR VALVE CONNECTOR

BACKGROUND OF THE INVENTION

The present invention relates to an inflator valve connector and, more particularly, to an inflator valve connector that can prevent air from leaking from the air valve when connecting or disconnecting the air valve.

When the valve connector of a conventional air pump connects or disconnects an air valve, there is inevitably a brief leakage of air. Further, when the user inflates an object to the desired pressure and then detaches the valve connector from the object's air valve, at the moment the valve connector is disconnected, the sealing ring inside the valve connector cannot seal the periphery of the air valve. However, the spindle of the valve connector is still in a position where it depresses the core of the air valve, causing the air inside the object to escape from the valve stem. This results in the actual pressure of the inflated object being lower than the desired pressure, making it impossible to achieve the precise desired pressure.

Thus, a need exists for an inflator valve connector to mitigate and/or obviate the above disadvantages.

SUMMARY OF THE INVENTION

In general, this disclosure describes an inflator valve connector that includes a body, a connecting assembly, a pushing member, and a lever. The body has an air channel configured to couple with a high pressure air source. The connecting assembly is rotatably connected to the body and configured to connect with an air valve. The pushing member is movably inserted through the body and the connecting assembly between a first position and a second position. The pushing member has a pushing end configured to push against a valve core of the air valve, and a pushed end disposed opposite to the pushing end. The pushing member is provided with at least one air passage communicating with the air channel. The lever selectively abuts against the pushed end of the pushing member in an unlock position and a lock position, and is configured to actuate the pushing member to move relative to the body and the connecting assembly.

In one example, the inflator valve connector further includes a biasing member configured to bias the pushing member towards the first position. The lever has a pivoting portion and an actuation portion. The pivoting portion has a first abutting surface and a second abutting surface selectively abutting against the pushed end of the pushing member. When the lever abuts against the pushing member in the unlock position, the pushing member is in the first position, and the first abutting surface abuts against the pushed end. When the lever abuts the pushing member in the lock position, the pushing member is in the second position, and the second abutting surface abuts against the pushed end to actuate the pushing end to push against the valve core of the air valve, allowing the at least one air passage to communicate with the interior of the air valve, and the biasing member is compressed.

In one example, the body is provided with a through hole communicating with the air channel. The connecting assembly includes a first connecting member rotatably inserted into the through hole, and a second connecting member connected to the first connecting member. The first connecting member has a connecting end connecting to the second connecting member, and an operating end opposite to the connecting end. The lever is eccentrically pivotally mounted on the operating end. The second connecting member protrudes from the through hole and has a distal end configured to connect with the air valve, and a proximal end connected to the connecting end.

In one example, the first connecting member is provided with a first connecting hole extending from the connecting end to the operating end, an operating portion located at the operating end, and a notch groove located in the operating portion. The first connecting hole communicates with the through hole. The biasing member is arranged in the first connecting hole. The operating portion protrudes from the through hole. A pivoting member is inserted through the operating portion, the notch groove, and the pivoting portion, allowing the pivoting portion eccentrically pivotally mounted in the notch groove. The second connecting member is provided with a second connecting hole extending from the distal end to the proximal end. The pushing member is movably inserted through the first connecting hole and the second connecting hole.

In one example, the second connecting member is provided with an inner threaded portion disposed on an inner surface of the second connecting hole adjacent to the distal end. The inner threaded portion is configured to detachably engage with an outer threaded portion of the air valve.

In one example, the first connecting member is provided with a first threaded portion disposed at the connecting end. The second connecting member is provided with a second threaded portion disposed at the proximal end and detachably engaged with the first threaded portion.

In one example, the first connecting member is provided with a shoulder portion disposed on an inner surface of the first connecting hole. The pushing member is provided with a body portion extending from the pushing end towards the pushed end, and a head portion located at the pushed end. The at least one air passage is formed in the body portion. One end of the biasing member abuts against the shoulder portion, and the other end of the biasing member abuts against the head portion to bias against the pushing member.

In one example, the second connecting member is provided with an airtight member arranged on the inner surface of the second connecting hole adjacent to the distal end. The airtight member located adjacent to the inner threaded portion.

In one example, an airtight ring is mounted on the head portion and abuts against the inner surface of the first connecting hole.

In another example, the body has a first end and a second end and is provided with a through hole extending from the first end to the second end and communicating with the air channel, and a notch groove located at the second end and communicating with the through hole. The biasing member is arranged in the through hole. A pivoting member is inserted through the second end, the notch groove, and the pivoting portion, allowing the pivoting portion eccentrically pivotally mounted in the notch groove.

In another example, the body has a limiting groove disposed on an outer surface of the first end. The connecting assembly includes a first connecting member, a second connecting member, and a fastener. The first connecting member has a distal end configured to connect with the air valve and a proximal end rotatably connected to the first end, and is provided with a connecting hole extending from the distal end to the proximal end. The pushing member is movably inserted through the through hole and the connecting hole. The second connecting member is rotatably sleeved on the first end and connected to the proximal end. The fastener is engaged in the limiting groove.

In another example, the first connecting member is provided with an inner threaded portion disposed on an inner surface of the connecting hole adjacent to the distal end. The inner threaded portion is configured to detachably engage with an outer threaded portion of the air valve.

In another example, the body is provided with a shoulder portion disposed on an inner surface of the through hole. The pushing member is provided with a body portion extending from the pushing end towards the pushed end, and a head portion located at the pushed end. The at least one air passage is formed in the body portion. One end of the biasing member abuts against the shoulder portion, and the other end of the biasing member abuts against the head portion to bias against the pushing member.

In another example, the first connecting member is provided with an airtight member arranged on the inner surface of the connecting hole adjacent to the distal end. The airtight member located adjacent to the inner threaded portion.

In another example, an airtight ring is mounted on the head portion and abuts against the inner surface of the through hole.

The present invention will become clearer in light of the following detailed description of illustrative embodiments of this invention described in connection with the drawings.

BRIEF DESCRIPTION OF DRAWINGS

Like reference characters refer to like elements throughout the figures and description.

DETAILED DESCRIPTION OF THE INVENTION

Figure 1:
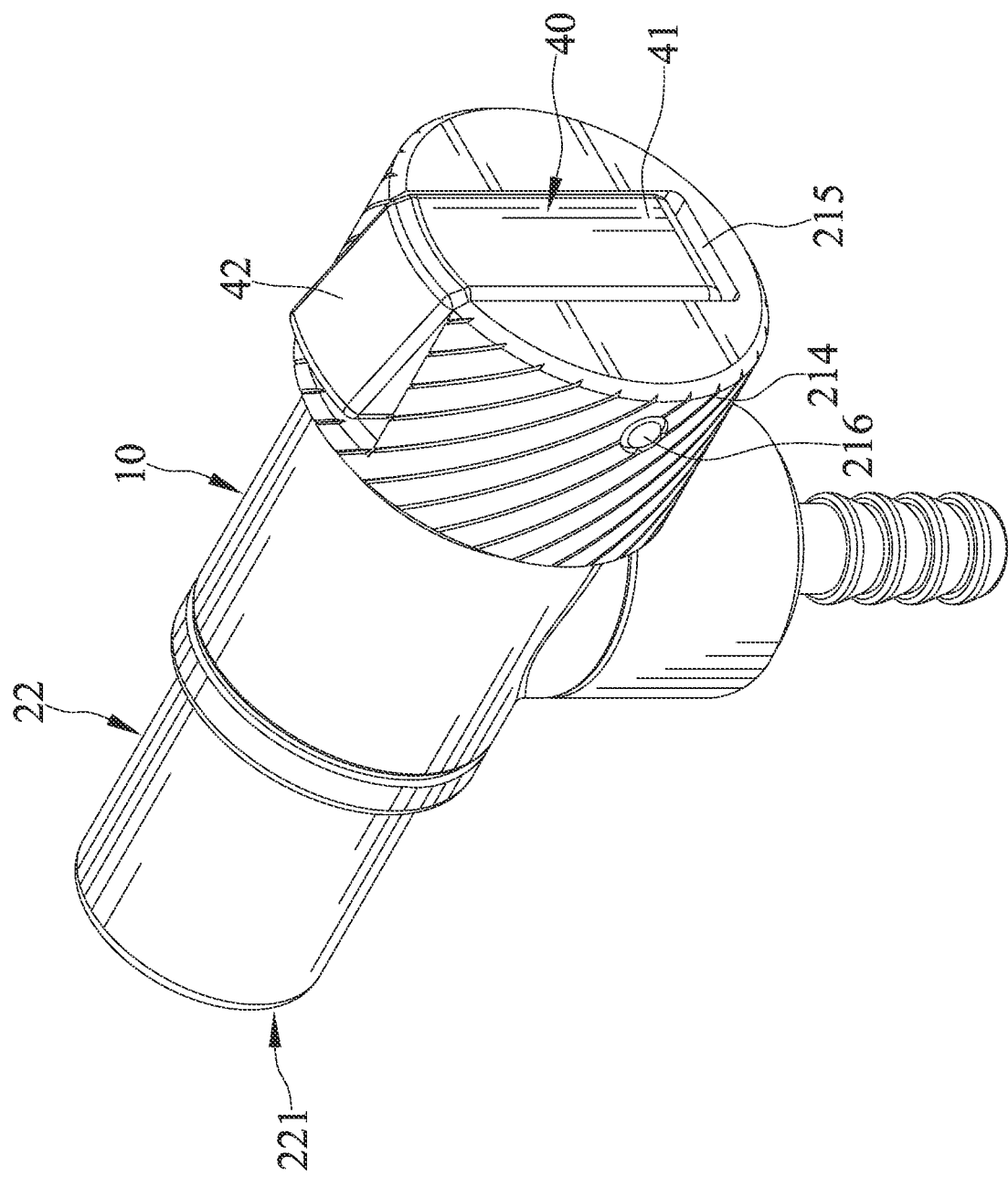
FIG. 1 is a perspective view of an inflator valve connector of a first embodiment according to the present invention.
Figure 2:
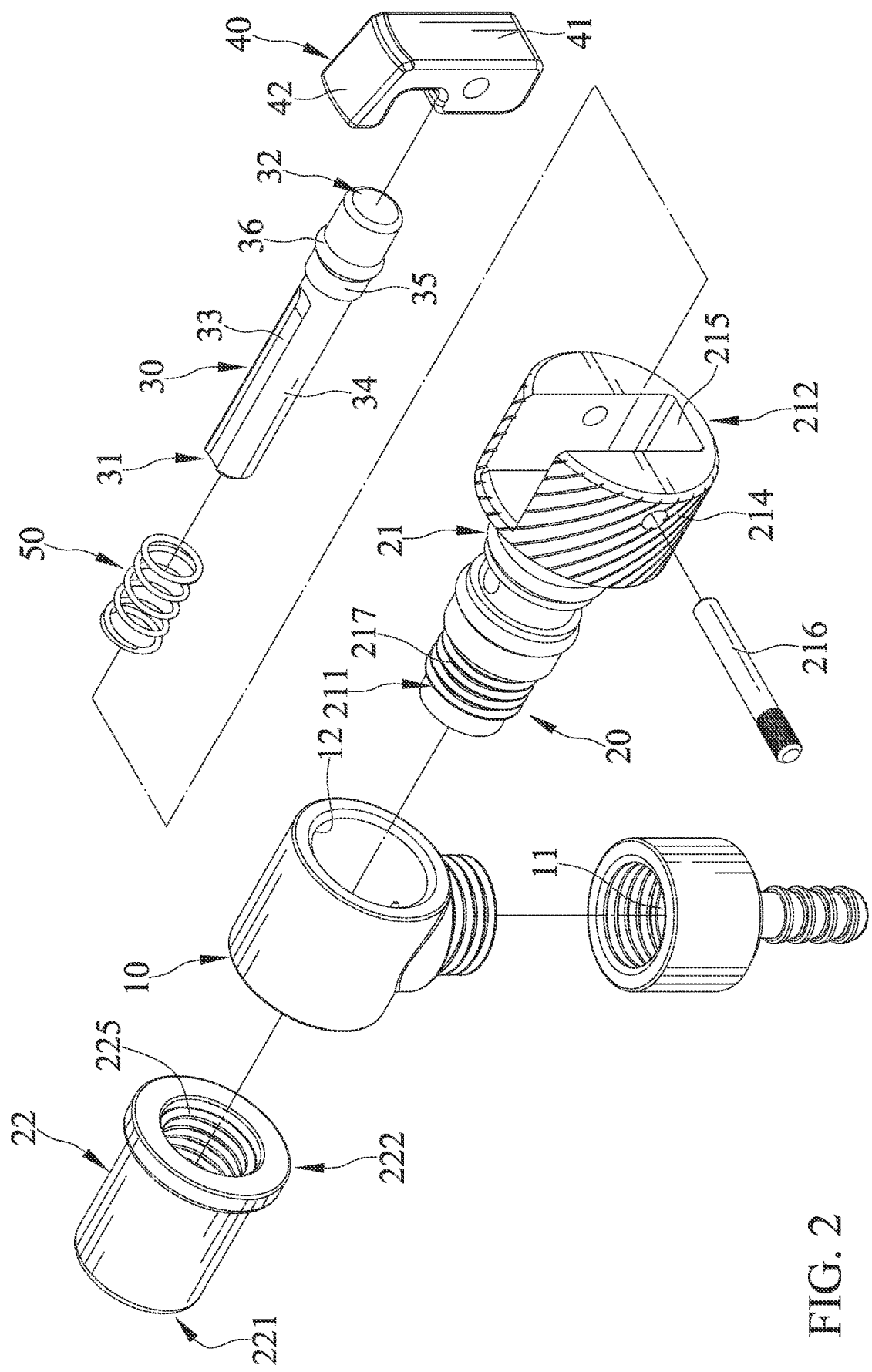
FIG. 2 is an exploded perspective view of the inflator valve connector of FIG. 1.

FIGS. 1-4 show an inflator valve connector of a first embodiment according to the present invention. The inflator valve connector includes a body 10, a connecting assembly 20, a pushing member 30, and a lever 40. The body 10 has an air channel 11 configured to couple with a high pressure air source H, such as an air pump, an inflator, or any device capable of generating high pressure air, in the embodiment is a hose connected to an air pump. The connecting assembly 20 is rotatably connected to the body 10 and configured to connect with an air valve V. The pushing member 30 is movably inserted through the body 10 and the connecting assembly 20 between a first position and a second position. The pushing member 30 has a pushing end 31 configured to push against a valve core VC of the air valve V, and a pushed end 32 disposed opposite to the pushing end 31. The pushing member 30 is provided with at least one air passage 33 communicating with the air channel 11. The lever 40 selectively abuts against the pushed end 32 of the pushing member 30 in an unlock position and a lock position, and the lever 40 is configured to actuate the pushing member 30 to move relative to the body 10 and the connecting assembly 20. Thus, the pushing end 31 of the pushing member 30 can selectively push against the valve core VC of the air valve V, allowing the air passage 33 to selectively communicate with the interior of the air valve V.

Further, the inflator valve connector includes a biasing member 50 configured to bias the pushing member 30 towards the first position. The lever 40 has a pivoting portion 41 and an actuation portion 42. The pivoting portion 41 has a first abutting surface 411 and a second abutting surface 412 selectively abutting against the pushed end 32 of the pushing member 30. When the lever 40 abuts against the pushing member 30 in the unlock position, the pushing member 30 is in the first position, and the first abutting surface 411 abuts against the pushed end 32, the pushing end 31 only contacts the valve core VC of the air valve V without pushing the valve core VC, allowing the air passage 33 to disconnect with the air valve V. When the lever 40 abuts the pushing member 30 in the lock position, the pushing member 30 is in the second position, and the second abutting surface 412 abuts against the pushed end 32 to actuate the pushing end 31 to push against the valve core VC of the air valve V, allowing the air passage 33 to communicate with the interior of the air valve V, and the biasing member 50 is compressed.

In the embodiment, the body 10 is provided with a through hole 12 communicating with the air channel 11. The connecting assembly 20 includes a first connecting member 21 rotatably inserted into the through hole 12, and a second connecting member 22 connected to the first connecting member 21. The first connecting member 21 has a connecting end 211 connecting to the second connecting member 22, and an operating end 212 opposite to the connecting end 211. The lever 40 is eccentrically pivotally mounted on the operating end 212. The second connecting member 22 protrudes from the through hole 12 and has a distal end 221 configured to connect with the air valve V, and a proximal end 222 connected to the connecting end 211.

Further, the first connecting member 21 is provided with a first connecting hole 213 extending from the connecting end 211 to the operating end 212, an operating portion 214 located at the operating end 212, and a notch groove 215 located in the operating portion 214. The first connecting hole 213 communicates with the through hole 12, and the biasing member 50 is arranged in the first connecting hole 213. The operating portion 214 protrudes from the through hole 12, and a pivoting member 216 is inserted through the operating portion 214, the notch groove 215, and the pivoting portion 41, allowing the pivoting portion 41 eccentrically pivotally mounted in the notch groove 215 to switch the lever 40 between the unlock position and the lock position. The second connecting member 22 is provided with a second connecting hole 223 extending from the distal end 221 to the proximal end 222, and the pushing member 30 is movably inserted through the first connecting hole 213 and the second connecting hole 223.

The second connecting member 22 is provided with an inner threaded portion 224 disposed on an inner surface of the second connecting hole 223 adjacent to the distal end 221, and the inner threaded portion 224 is configured to detachably engage with an outer threaded portion VT of the air valve V, allowing the distal end 221 of the second connecting member 22 to connect to the air valve V.

The first connecting member 21 is provided with a first threaded portion 217 disposed at the connecting end 211, and the second connecting member 22 is provided with a second threaded portion 225 disposed at the proximal end 222 and detachably engaged with the first threaded portion 217, allowing the second connecting member 22 to connect to the first connecting member 21.

The first connecting member 21 is provided with a shoulder portion 218 disposed on an inner surface of the first connecting hole 213. The pushing member 30 is provided with a body portion 34 extending from the pushing end 31 towards the pushed end 32, and a head portion 35 located at the pushed end 32. The air passage 33 is formed in the body portion 34, in the embodiment, the air passage 33 is formed on each of the opposite sides of the body portion 34. One end of the biasing member 50 abuts against the shoulder portion 218, and the other end of the biasing member 50 abuts against the head portion 35 to bias against the pushing member 30 towards the first position, allowing the pushing member 30 to switch between the first and second positions.

The second connecting member 22 is provided with an airtight member 226 arranged on the inner surface of the second connecting hole 223 adjacent to the distal end 221, and the airtight member 226 located adjacent to the inner threaded portion 224. Thus, the airtight member 226 can selectively abut against the air valve V to maintain airtightness. An airtight ring 36 is mounted on the head portion 35 and abuts against the inner surface of the first connecting hole 213.

Figure 3:
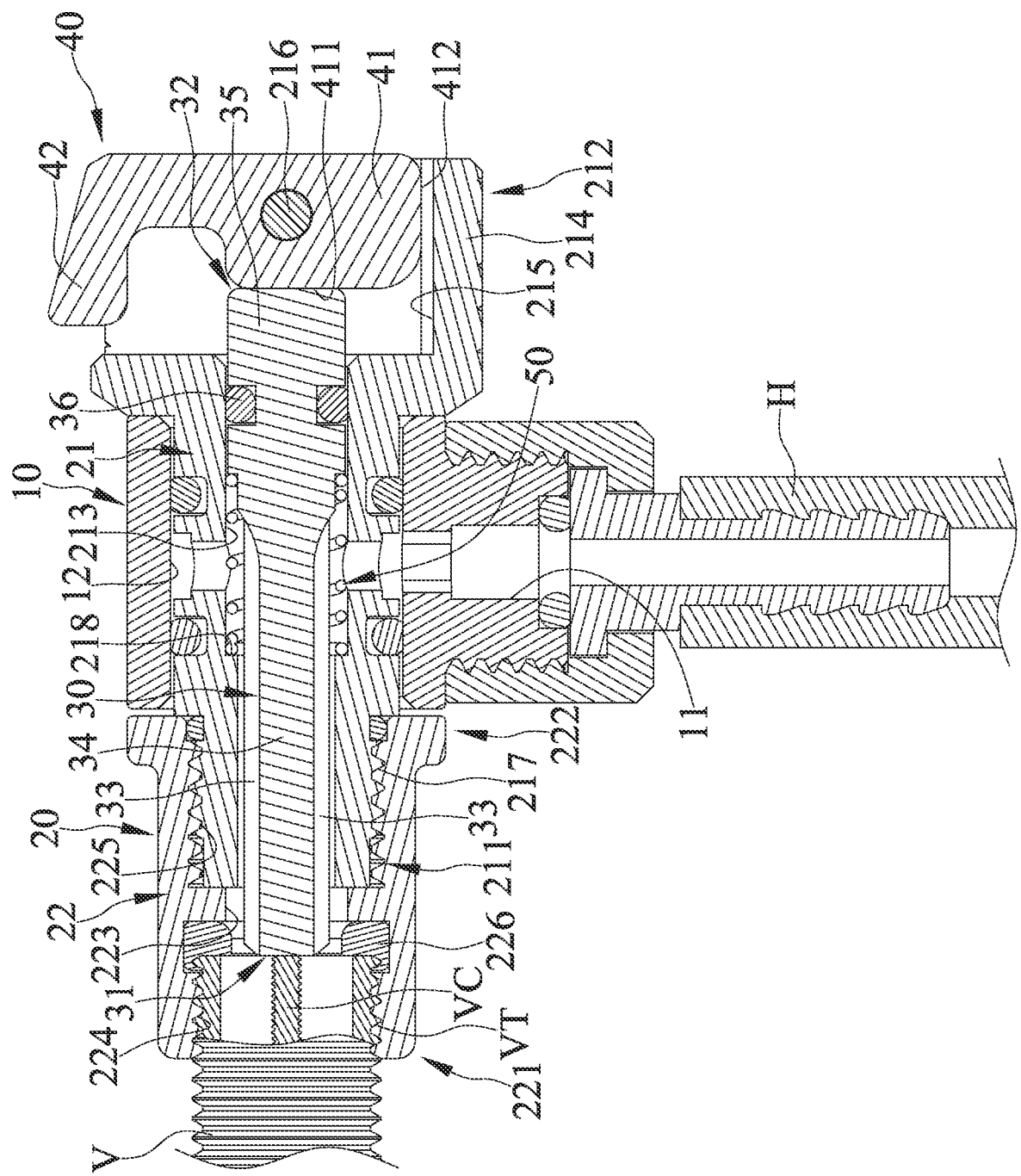
FIG. 3 is a cross sectional view of the inflator valve connector of FIG. 1 and shows a lever in a first position.

As shown in FIG. 3, a user can rotate the connecting assembly 20, so that the inner threaded portion 224 of the second connecting member 22 is engaged with the outer threaded portion VT of the air valve V, until the airtight member 226 abuts against the air valve V to maintain airtightness. When the lever 40 abuts against the pushing member 30 in the unlock position, the pushing member 30 is in the first position, the first abutting surface 411 abuts against the head portion 35 of the pushed end 32, the head portion 35 is in the notch groove 215, the biasing member 50 is uncompressed, and the pushing end 31 only contacts the valve core VC of the air valve V without pushing the valve core VC, allowing the air passage 33 to disconnect with the air valve V, thus completing the preparation before inflation.

Figure 4:
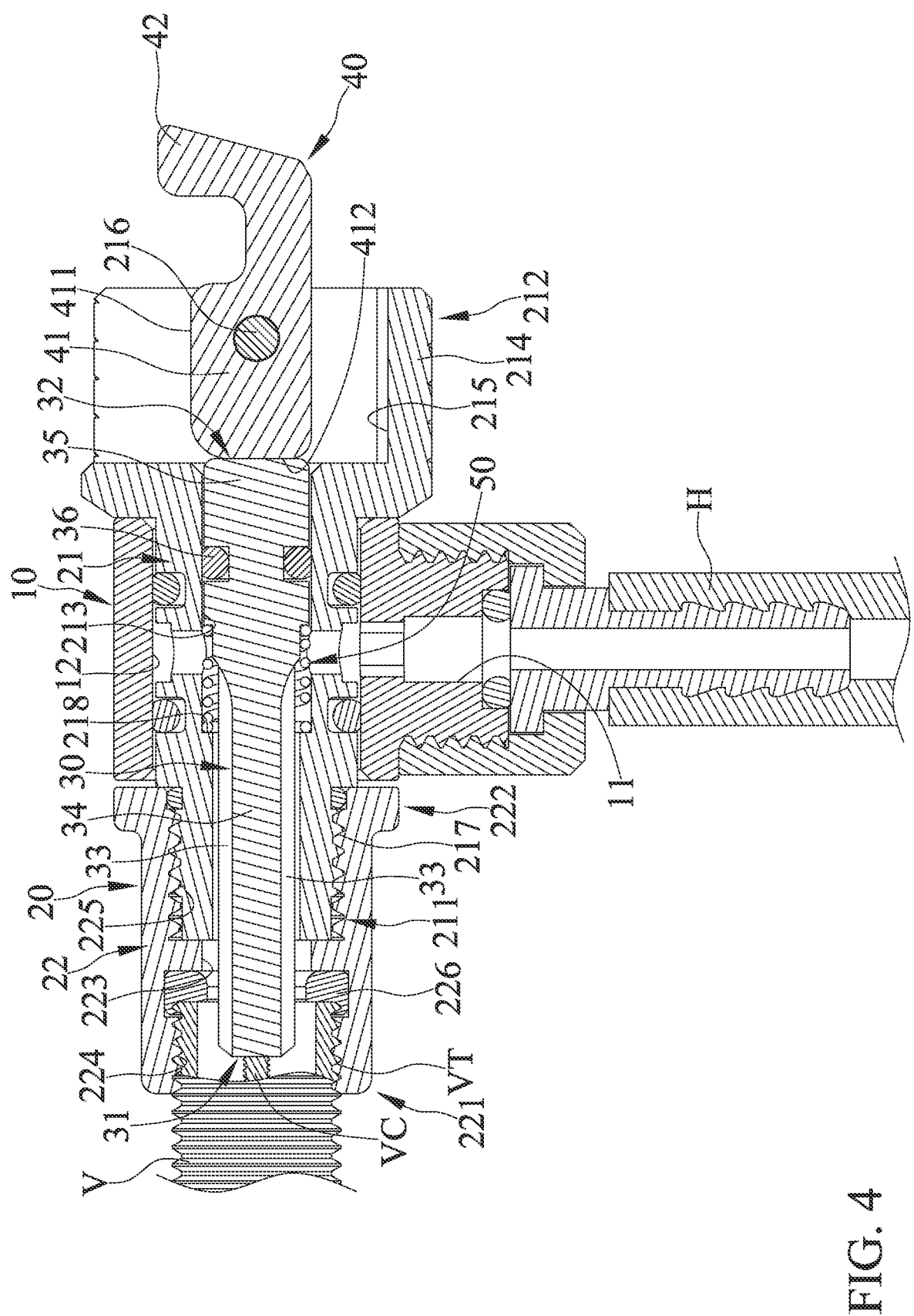
FIG. 4 is a continued view of FIG. 3 and shows the lever in a second position.
Figure 5:
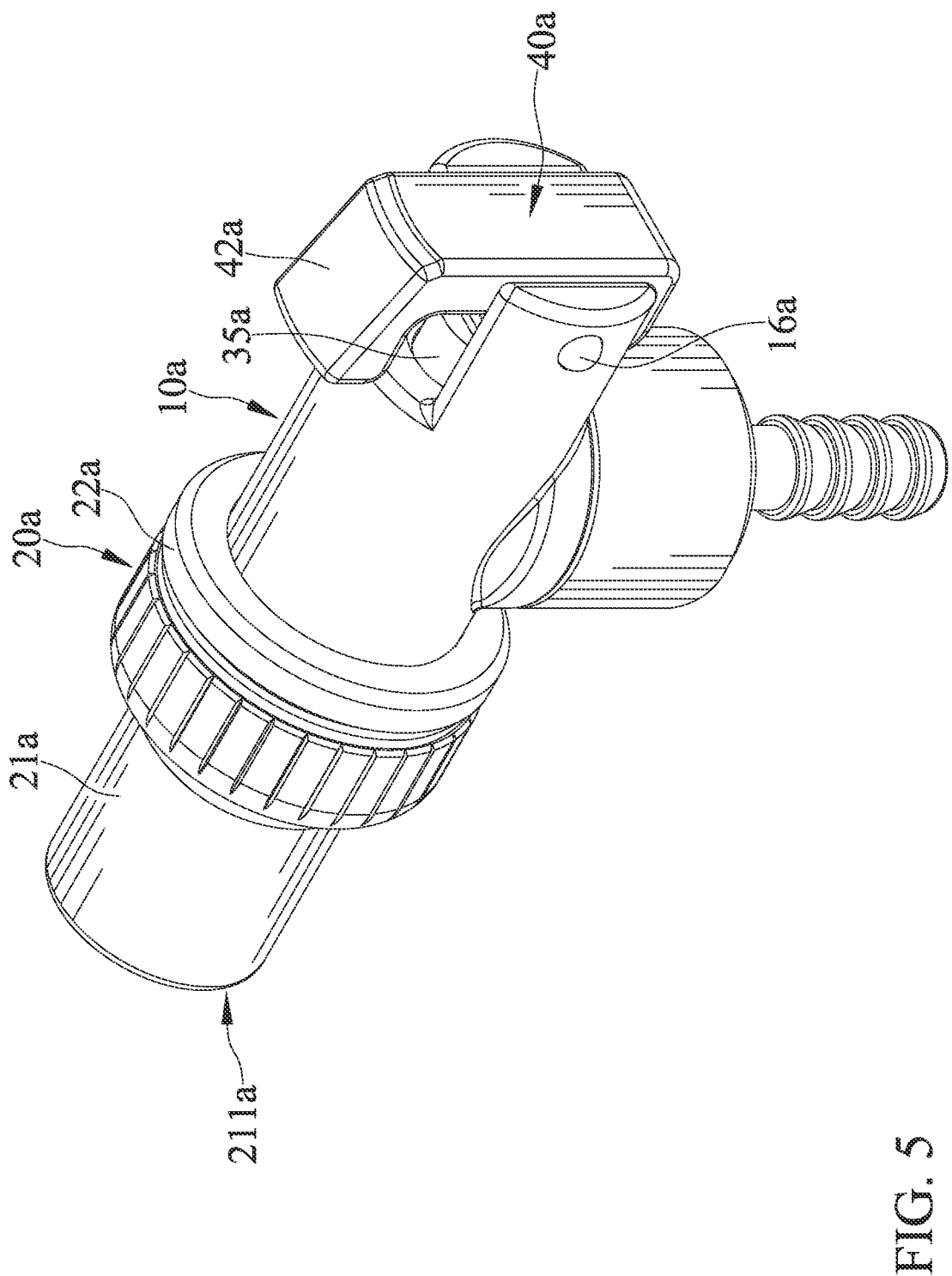
FIG. 5 is a perspective view of an inflator valve connector of a second embodiment according to the present invention.
Figure 6:
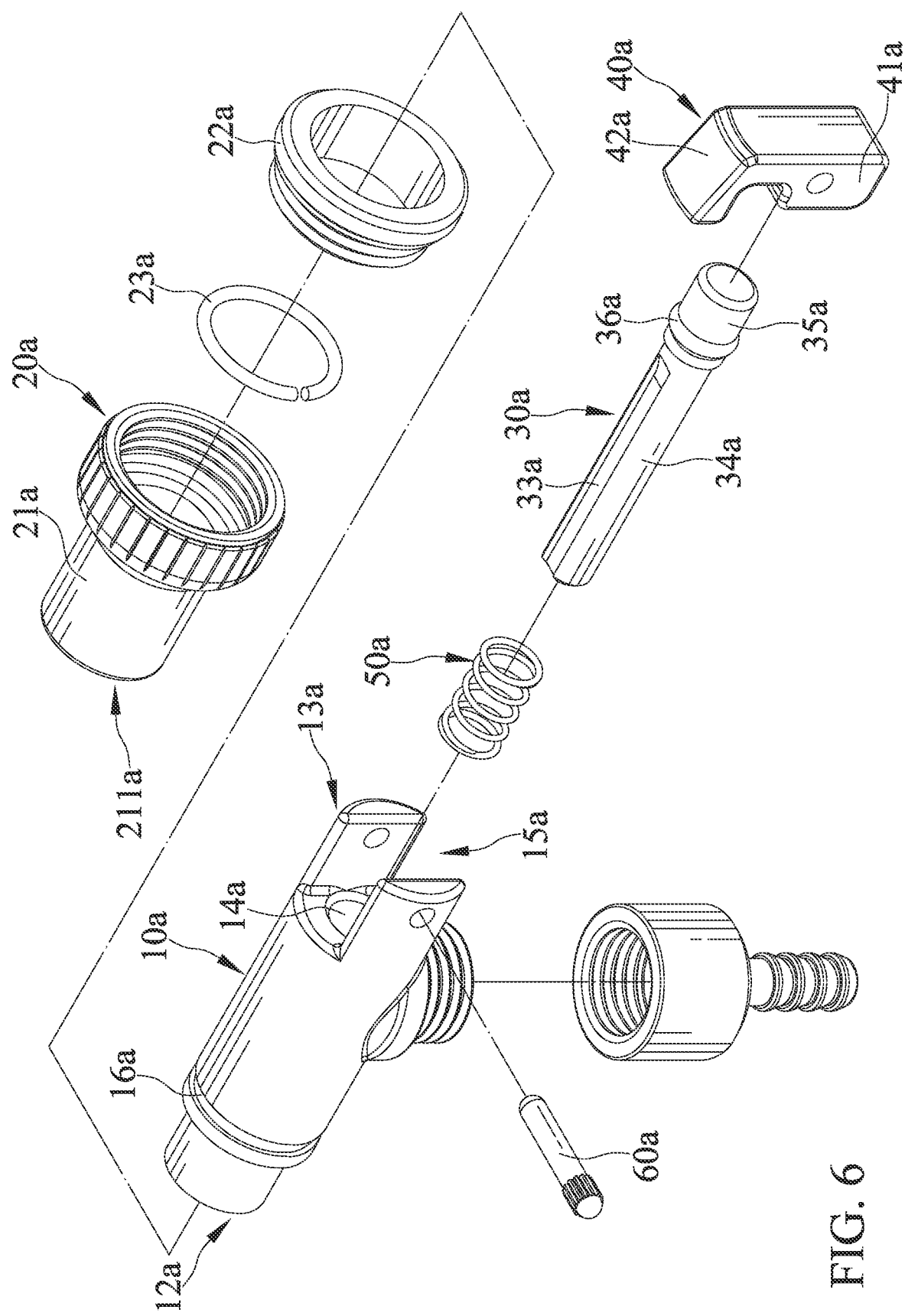
FIG. 6 is an exploded perspective view of the inflator valve connector of FIG. 5.

As shown in FIG. 4, the user can operate the actuation portion 42 of the lever 40, causing the lever 40 to pivot relative to the notch groove 215 and switch from the unlock position to the lock position. The head portion 35 of the pushing member 30 is pushed by the pivoting portion 41 of the lever 40 to move relative to the through hole 12, the first connecting hole 213, and the second connecting hole 223 to switch from the first position to the second position. When the lever 40 abuts the pushing member 30 in the lock position, the pushing member 30 is in the second position, the second abutting surface 412 abuts against the head portion 35 of the pushed end 32 to actuate the pushing end 31 to push against the valve core VC of the air valve V, and the biasing member 50 is compressed, allowing the air passage 33 to communicate with the interior of the air valve V. Therefore, the high pressure air from the high pressure air source H can enter the interior of the air valve V through the air channel 11 and the air passage 33 for inflation. After the inflation is complete, the user operates the lever 40 again, causing the lever 40 to pivot relative to the notch groove 215 and switch from the lock position back to the unlock position. Correspondingly, the pushing member 30 returns from the second position to the first position. Thus, the air passage 33 and the air valve V are disconnected, allowing the outer threaded portion VT of the air valve V to be detached from the inner threaded portion 224 of the second connecting member 22, to prevent air from leaking out of the air valve V.

FIGS. 5-8 show an inflator valve connector of a second embodiment according to the present invention. The inflator valve connector includes a body 10*a*, a connecting assembly 20*a*, a pushing member 30*a*, and a lever 40*a*. The body 10*a* has an air channel 11*a* configured to couple with a high pressure air source H, such as an air pump, an inflator, or any device capable of generating high pressure air, in the embodiment is a hose connected to an air pump. The connecting assembly 20*a* is rotatably connected to the body 10*a* and configured to connect with an air valve V. The pushing member 30*a* is movably inserted through the body 10*a* and the connecting assembly 20*a* between a first position and a second position. The pushing member 30*a* has a pushing end 31*a* configured to push against a valve core VC of the air valve V, and a pushed end 32*a* disposed opposite to the pushing end 31*a*. The pushing member 30*a* is provided with at least one air passage 33*a* communicating with the air channel 11*a*. The lever 40*a* selectively abuts against the pushed end 32*a* of the pushing member 30*a* in an unlock position and a lock position, and the lever 40*a* is configured to actuate the pushing member 30*a* to move relative to the body 10*a* and the connecting assembly 20*a*. Thus, the pushing end 31*a* of the pushing member 30*a* can selectively push against the valve core VC of the air valve V, allowing the air passage 33*a* to selectively communicate with the interior of the air valve V.

Further, the inflator valve connector includes a biasing member 50*a* configured to bias the pushing member 30*a* towards the first position. The lever 40*a* has a pivoting portion 41*a* and an actuation portion 42*a*. The pivoting portion 41*a* has a first abutting surface 411*a* and a second abutting surface 412*a* selectively abutting against the pushed end 32*a* of the pushing member 30*a*. When the lever 40*a* abuts against the pushing member 30*a* in the unlock position, the pushing member 30*a* is in the first position, the first abutting surface 411*a* abuts against the pushed end 32*a*, and the pushing end 31*a* only contacts the valve core VC of the air valve V without pushing the valve core VC, allowing the air passage 33*a* to disconnect with the air valve V. When the lever 40*a* abuts the pushing member 30*a* in the lock position, the pushing member 30*a* is in the second position, and the second abutting surface 412*a* abuts against the pushed end 32*a* to actuate the pushing end 31*a* to push against the valve core VC of the air valve V, allowing the air passage 33*a* to communicate with the interior of the air valve V, and the biasing member 50*a* is compressed.

In the embodiment, the body 10*a* has a first end 12*a* and a second end 13*a* and is provided with a through hole 14*a* extending from the first end 12*a* to the second end 13*a* and communicating with the air channel 11*a*, and a notch groove 15*a* located at the second end 13*a* and communicating with the through hole 14*a*. The biasing member 50*a* is arranged in the through hole 14*a*, and a pivoting member 60*a* is inserted through the second end 13*a*, the notch groove 15*a*, and the pivoting portion 41*a*, allowing the pivoting portion 41*a* eccentrically pivotally mounted in the notch groove 15*a* to switch the lever 40*a* between the unlock position and the lock position.

Further, the body 10*a* has a limiting groove 16*a* disposed on an outer surface of the first end 12*a*. The connecting assembly 20*a* includes a first connecting member 21*a*, a second connecting member 22*a*, and a fastener 23*a*. The first connecting member 21*a* has a distal end 211*a* configured to connect with the air valve V and a proximal end 212*a* rotatably connected to the first end 12a, and is provided with a connecting hole 213a extending from the distal end 211a to the proximal end 212a. The pushing member 30a is movably inserted through the through hole 14a and the connecting hole 213a. The second connecting member 22a is rotatably sleeved on the first end 12a and connected to the proximal end 212a. The fastener 23a is engaged in the limiting groove 16a, allowing the connecting assembly 20a to rotate relative to the body 10a. In the embodiment, the fastener 23a may be a C-ring constructed of a resilient material.

The first connecting member 21a is provided with an inner threaded portion 214a disposed on an inner surface of the connecting hole 213a adjacent to the distal end 211a, and wherein the inner threaded portion 214a is configured to detachably engage with an outer threaded portion VT of the air valve V, allowing the distal end 211a of the second connecting member 22a to connect to the air valve V.

The body 10a is provided with a shoulder portion 17a disposed on an inner surface of the through hole 14a. The pushing member 30a is provided with a body portion 34a extending from the pushing end 31a towards the pushed end 32a, and a head portion 35a located at the pushed end 32a. The air passage 33a is formed in the body portion 34a, in the embodiment, the air passage 33a is formed on each of the opposite sides of the body portion 34a. One end of the biasing member 50a abuts against the shoulder portion 17a, and the other end of the biasing member 50a abuts against the head portion 35a to bias against the pushing member 30a, allowing the pushing member 30a to switch between the first and second positions.

The first connecting member 21a is provided with an airtight member 215a arranged on the inner surface of the connecting hole 213a adjacent to the distal end 211a, and the airtight member 215a located adjacent to the inner threaded portion 214a. Thus, the airtight member 215a can selectively abut against the air valve V to maintain airtightness. Additionally, an airtight ring 36a is mounted on the head portion 35a and abuts against the inner surface of the through hole 14a.

Figure 7:
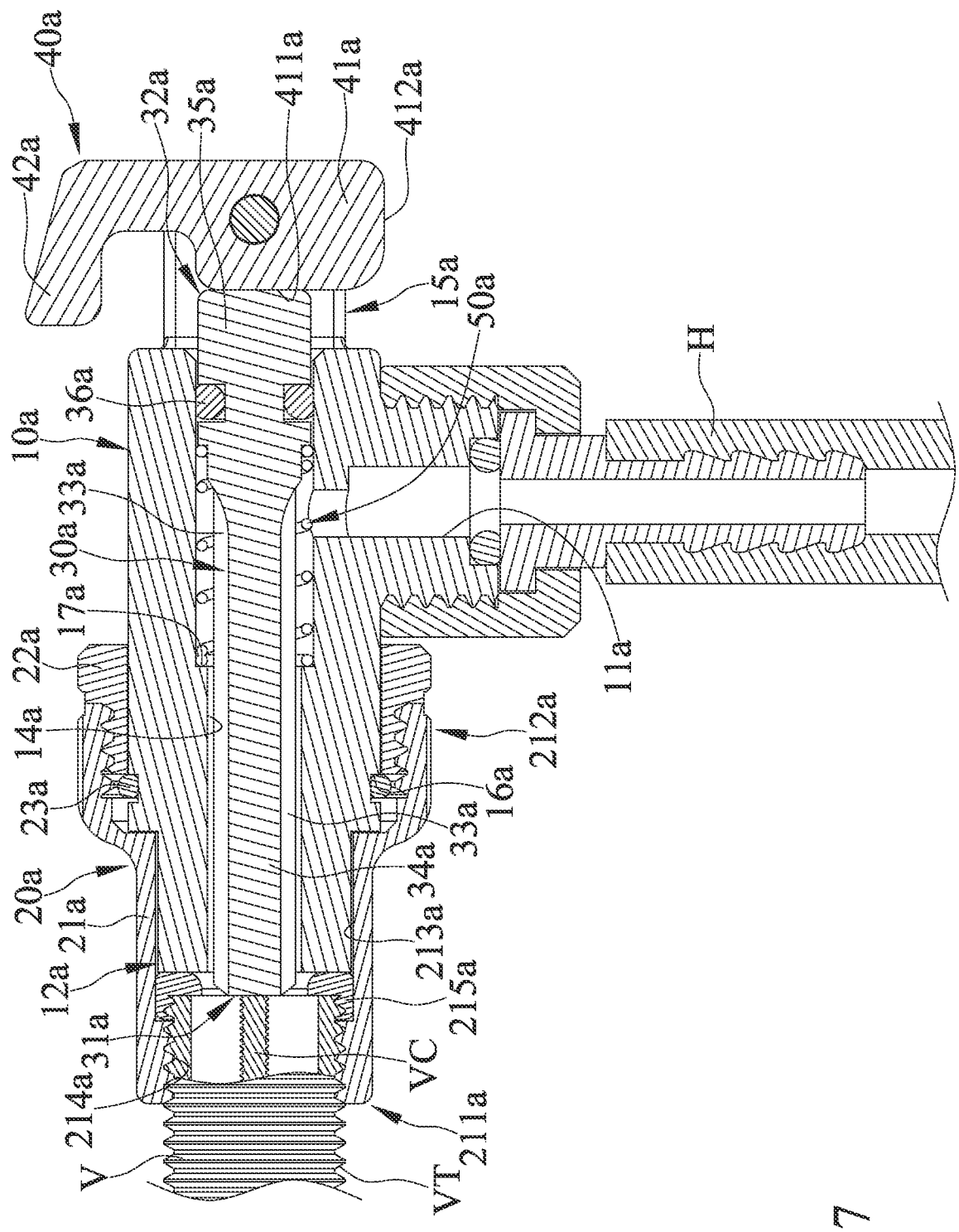
FIG. 7 is a cross sectional view of the inflator valve connector of FIG. 5 and shows a lever in a first position.

As shown in FIG. 7, a user can rotate the connecting assembly 20a, so that the inner threaded portion 214a of the first connecting member 21a is engaged with the outer threaded portion VT of the air valve V, until the airtight member 215a abuts against the air valve V to maintain airtightness. When the lever 40a abuts against the pushing member 30a in the unlock position, the pushing member 30a is in the first position, the first abutting surface 411a abuts against the head portion 35a of the pushed end 32a, the head portion 35a is in the notch groove 15a, the biasing member 50a is uncompressed, and the pushing end 31a only contacts the valve core VC of the air valve V without pushing the valve core VC, allowing the air passage 33a to disconnect with the air valve V, thus completing the preparation before inflation.

Figure 8:
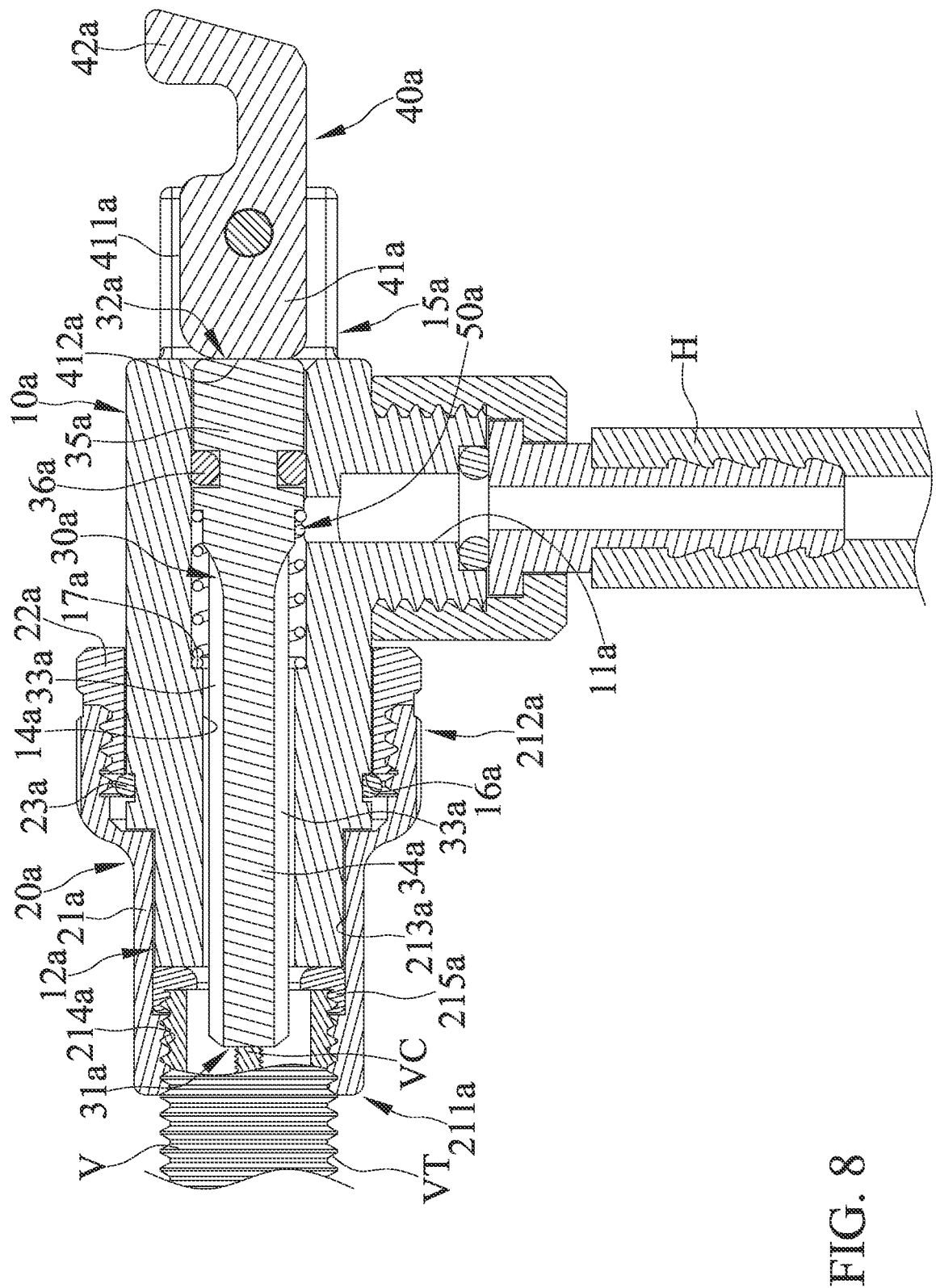
FIG. 8 is a continued view of FIG. 7 and shows the lever in a second position.

As shown in FIG. 8, the user can operate the actuation portion 42a of the lever 40a, causing the lever 40a to pivot relative to the notch groove 15a and switch from the unlock position to the lock position. The head portion 35a of the pushing member 30a is pushed by the pivoting portion 41a of the lever 40a to move relative to the through hole 14a and the connecting hole 213a to switch from the first position to the second position. When the lever 40a abuts the pushing member 30a in the lock position, the pushing member 30a is in the second position, the second abutting surface 412a abuts against the head portion 35a of the pushed end 32a to actuate the pushing end 31a to push against the valve core VC of the air valve V, and the biasing member 50a is compressed, allowing the air passage 33a to communicate with the interior of the air valve V. Therefore, the high pressure air from the high pressure air source H can enter the interior of the air valve V through the air channel 11a and the air passage 33a for inflation. After the inflation is complete, the user operates the lever 40a again, causing the lever 40a to pivot relative to the notch groove 15a and switch from the lock position back to the unlock position. Correspondingly, the pushing member 30a returns from the second position to the first position. Thus, the air passage 33a and the air valve V are disconnected, allowing the outer threaded portion VT of the air valve V to be detached from the inner threaded portion 224 of the second connecting member 22, to prevent air from leaking out of the air valve V.

In summary, according to the embodiments of the present invention, before inflation, the air valve V can first be engaged onto the connecting assembly 20, 20a. Once the air valve V and the connecting assembly 20, 20a are airtight, the lever 40, 40a can be operated from the unlock position to the lock position. The lever 40, 40a drives the pushing member 30, 30a to move from the first position to the second position. The pushing member 30, 30a abuts against the valve core VC of the air valve V, allowing the air passage 33, 33a to communicate with the interior of the air valve V for inflation. After the inflation is complete, the lever 40, 40a is operated back from the lock position to the unlock position, allowing the pushing member 30, 30a to return to the first position, the pushing member 30, 30a then only contacts the valve core VC of the air valve V. Thus, the air valve V is disconnected from the air passage 33, 33a of the pushing member 30, 30a. The air valve V can then be detached from the connecting assembly 20, 20a, to prevent air from leaking out of the air valve V.

Although specific embodiments have been illustrated and described, numerous modifications and variations are still possible without departing from the scope of the invention. The scope of the invention is limited by the accompanying claims.

The invention claimed is:

1. An inflator valve connector comprising:
a body having an air channel configured to couple with a high pressure air source, wherein the body is provided with a through hole communicating with the air channel;
a connecting assembly rotatably connected to the body and configured to connect with an air valve, wherein the connecting assembly includes a first connecting member rotatably inserted into the through hole, and a second connecting member connected to the first connecting member, wherein the first connecting member has a connecting end connecting to the second connecting member, and an operating end opposite to the connecting end, wherein the second connecting member protrudes from the through hole and has a distal end configured to connect with the air valve, and a proximal end connected to the connecting end;
a pushing member movably inserted through the body and the connecting assembly between a first position and a second position, wherein the pushing member has a pushing end configured to push against a valve core of the air valve, and a pushed end disposed opposite to the pushing end, wherein the pushing member is provided with at least one air passage communicating with the air channel;
a lever selectively abutting against the pushed end of the pushing member in an unlock position and a lock position, wherein the lever is configured to actuate the pushing member to move relative to the body and the connecting assembly, wherein the lever is eccentrically pivotally mounted on the operating end, wherein the lever has a pivoting portion and an actuation portion, wherein the pivoting portion has a first abutting surface and a second abutting surface selectively abutting against the pushed end of the pushing member; and a biasing member configured to bias the pushing member towards the first position;

wherein when the lever abuts against the pushing member in the unlock position, the pushing member is in the first position, and the first abutting surface abuts against the pushed end;

wherein when the lever abuts the pushing member in the lock position, the pushing member is in the second position, and the second abutting surface abuts against the pushed end to actuate the pushing end to push against the valve core of the air valve, allowing the at least one air passage to communicate with an interior of the air valve, and the biasing member is compressed.

2. The inflator valve connector as claimed in claim 1, wherein the first connecting member is provided with a first connecting hole extending from the connecting end to the operating end, an operating portion located at the operating end, and a notch groove located in the operating portion, wherein the first connecting hole communicates with the through hole, wherein the biasing member is arranged in the first connecting hole, wherein the operating portion protrudes from the through hole, wherein a pivoting member is inserted through the operating portion, the notch groove, and the pivoting portion, allowing the pivoting portion to be eccentrically pivotally mounted in the notch groove, wherein the second connecting member is provided with a second connecting hole extending from the distal end to the proximal end, and wherein the pushing member is movably inserted through the first connecting hole and the second connecting hole.

3. The inflator valve connector as claimed in claim 2, wherein the first connecting member is provided with a first threaded portion disposed at the connecting end, and wherein the second connecting member is provided with a second threaded portion disposed at the proximal end and detachably engaged with the first threaded portion.

4. The inflator valve connector as claimed in claim 2, wherein the second connecting member is provided with an inner threaded portion disposed on an inner surface of the second connecting hole adjacent to the distal end, and wherein the inner threaded portion is configured to detachably engage with an outer threaded portion of the air valve.

5. The inflator valve connector as claimed in claim 4, wherein the second connecting member is provided with an airtight member arranged on the inner surface of the second connecting hole adjacent to the distal end, and wherein the airtight member is located adjacent to the inner threaded portion.

6. The inflator valve connector as claimed in claim 2, wherein the first connecting member is provided with a shoulder portion disposed on an inner surface of the first connecting hole, wherein the pushing member is provided with a body portion extending from the pushing end towards the pushed end, and a head portion located at the pushed end, wherein the at least one air passage is formed in the body portion, and wherein one end of the biasing member abuts against the shoulder portion, and an other end of the biasing member abuts against the head portion to bias against the pushing member.

7. The inflator valve connector as claimed in claim 6, wherein an airtight ring is mounted on the head portion and abuts against the inner surface of the first connecting hole.

8. An inflator valve connector comprising:

a body having an air channel configured to couple with a high pressure air source, wherein the body defines a first end and a second end and is provided with a through hole extending from the first end to the second end and communicating with the air channel, and a notch groove located at the second end and communicating with the through hole, wherein the body has a limiting groove disposed on an outer surface of the first end;

a connecting assembly rotatably connected to the body and configured to connect with an air valve, wherein the connecting assembly includes a first connecting member, a second connecting member, and a fastener, wherein the first connecting member has a distal end configured to connect with the air valve and a proximal end rotatably connected to the first end, and is provided with a connecting hole extending from the distal end to the proximal end, wherein the second connecting member is rotatably sleeved on the first end and connected to the proximal end, and wherein the fastener is engaged in the limiting groove;

a pushing member movably inserted through the body and the connecting assembly between a first position and a second position, wherein the pushing member is movably inserted through the through hole and the connecting hole, wherein the pushing member has a pushing end configured to push against a valve core of the air valve, and a pushed end disposed opposite to the pushing end, wherein the pushing member is provided with at least one air passage communicating with the air channel;

a lever selectively abutting against the pushed end of the pushing member in an unlock position and a lock position, wherein the lever is configured to actuate the pushing member to move relative to the body and the connecting assembly, wherein the lever has a pivoting portion and an actuation portion, wherein the pivoting portion has a first abutting surface and a second abutting surface selectively abutting against the pushed end of the pushing member;

a biasing member configured to bias the pushing member towards the first position, wherein the biasing member is arranged in the through hole;

a pivoting member inserted through the second end, the notch groove, and the pivoting portion, allowing the pivoting portion to be eccentrically pivotally mounted in the notch groove;

wherein when the lever abuts against the pushing member in the unlock position, the pushing member is in the first position, and the first abutting surface abuts against the pushed end;

wherein when the lever abuts the pushing member in the lock position, the pushing member is in the second position, and the second abutting surface abuts against the pushed end to actuate the pushing end to push against the valve core of the air valve, allowing the at least one air passage to communicate with an interior of the air valve, and the biasing member is compressed.

9. The inflator valve connector as claimed in claim 8, wherein the first connecting member is provided with an inner threaded portion disposed on an inner surface of the connecting hole adjacent to the distal end, and wherein the inner threaded portion is configured to detachably engage with an outer threaded portion of the air valve.

10. The inflator valve connector as claimed in claim 9, wherein the first connecting member is provided with an airtight member arranged on the inner surface of the connecting hole adjacent to the distal end, and wherein the airtight member located adjacent to the inner threaded portion.

11. The inflator valve connector as claimed in claim 8, wherein the body is provided with a shoulder portion disposed on an inner surface of the through hole, wherein the pushing member is provided with a body portion extending from the pushing end towards the pushed end, and a head portion located at the pushed end, wherein the at least one air passage is formed in the body portion, and wherein one end of the biasing member abuts against the shoulder portion, and an other end of the biasing member abuts against the head portion to bias against the pushing member.

12. The inflator valve connector as claimed in claim 11, wherein an airtight ring is mounted on the head portion and abuts against the inner surface of the through hole.

\* \* \* \* \*